United States Patent [19]

Kisou

[11] Patent Number: 4,928,165
[45] Date of Patent: May 22, 1990

[54] NOISE REDUCTION CIRCUIT FOR A CHROMINANCE SIGNAL OF A USING FRAME CORRELATION

[75] Inventor: Masaaki Kisou, Chiba, Japan

[73] Assignee: Kabushiki Kaisha Toshiba, Kanagawa, Japan

[21] Appl. No.: 222,609

[22] Filed: Jul. 21, 1988

[30] Foreign Application Priority Data

Jul. 23, 1987 [JP] Japan ............................. 62-182204

[51] Int. Cl.$^5$ ................... H04N 9/64; H04N 5/213
[52] U.S. Cl. .................................. 358/36; 358/167
[58] Field of Search .................. 358/36, 37, 316, 167

[56] References Cited

U.S. PATENT DOCUMENTS

| | | | |
|---|---|---|---|
| 4,058,836 | 11/1977 | Drewery et al. | 358/167 |
| 4,246,610 | 1/1981 | Takahashi | 358/167 |
| 4,291,333 | 9/1981 | Warnock et al. | 358/36 |
| 4,333,104 | 6/1982 | Geller | 358/23 |
| 4,670,775 | 6/1987 | Faroudja et al. | 358/36 |
| 4,823,184 | 4/1989 | Belmares-Sarabia et al. | 358/27 |

FOREIGN PATENT DOCUMENTS 196756 10/1986 European Pat. Off.
70687 3/1988 Japan.

Primary Examiner—James J. Groody
Assistant Examiner—Robert M. Bauer
Attorney, Agent, or Firm—Finnegan, Henderson, Farabow, Garrett and Dunner

[57] ABSTRACT

A circuit for reducing noises of a chrominance signal in a television receiver. The circuit includes a decoder for decoding first and second color difference signals, each including a noise component from a received chrominance signal, a signal subtraction circuit for generating a first frame difference signal in response to two successive first color difference signals and a second frame difference signal in response to two successive second color difference signals, a signal converting circuit for extracting a first compensation signal from the first frame difference signal and a second compensation signal from the second frame difference signal, a noise reduction circuit for reducing noises from the color difference signals in response to the compensation signals, a discrimination circuit for discriminating whether both the first and second frame difference signals are smaller than a prescribed level or not and for generating a control signal in response thereto, and a signal transmission circuit for transferring the compensation signals from the signal converting circuit to the noise reduction circuit in response to the control signal only when both the frame difference signals are smaller than the prescribed level.

4 Claims, 2 Drawing Sheets

NOISE REDUCTION CIRCUIT FOR A CHROMINANCE SIGNAL OF A USING FRAME CORRELATION

FIELD OF THE INVENTION

The present invention relates to a noise reduction circuit for television receivers, and more particularly, to a noise reduction circuit utilizing frame correlation to reduce noise mixed into a chrominance signal in television receivers.

BACKGROUND OF THE INVENTION

A conventionally, noise reduction circuit for television receivers utilizing frame correlation is well understood. In general, signal components, i.e., video components, have a high correlation between successive frame video signals. Noise components, however, have a low correlation between successive frame video signals. Typically, the frame difference signal representing the difference between the video components of two successive frame video signals is almost zero for a static picture, and is a relatively large value for a changing picture or a picture-in-motion. The frame difference signal representing the difference between the noise components of two successive frame video signals is small for both a static picture and a picture-in-motion. Thus, a low level frame difference signal can be assumed to represent noise included in the frame video signals.

Therefore, a typical noise reduction circuit extracts a low-level frame difference signal from the frame video signal. Thus, the noise component of the video signal corresponding to the frame difference signal of low level is removed from the video signal by subtraction. In such a noise reduction circuit, a frame memory is used for establishing a delayed one of the successive frame video signals. The frame memory stores the input video signal for a period corresponding to the time between successive frames of the first and second color difference signals.

Further, such a conventional noise reduction circuit has a decoding circuit and a pair of noise reduction circuits. The decoding circuit decodes two color difference signals (for example, color difference signals R−Y and B−Y) from the chrominance signals. Hereupon, the color difference signals R−Y and B−Y are transmitted together with a luminance signal Y in place of three color signals, i.e., in place of a red color signal R, a green color signal G and a blue color signal B in an NTSC television system. Television receivers then reproduce the three color signals R, G and B from the luminance signal Y and the color difference signals R−Y and B−Y. The color difference signals R−Y and B−Y represent difference signals between the red color signal R and the luminance signal Y and the the blue color signal B and the luminance signal Y.

Each of the noise reduction circuits receives the color difference signal R−Y or B−Y as its one input signal to carry out noise reduction and also receives a frame difference signal between successive frame signals of the color difference signal R−Y or B−Y, when the level of the frame difference signal is lower than a prescribed level.

In more detail, the frame difference signals are converted to corresponding compensation signals by converting circuits, as described later. The compensation signals are subtracted from the corresponding color difference signals. Thus, noise in the color difference signals are reduced.

The conventional noise reduction circuit carries out the noise component extracting operation, i.e., the noise reduction, when the frame difference signal is lower than a prescribed level. The circuit interrupts the noise component extracting operation so that the noise reduction is not carried out when the frame difference signal is higher than the prescribed level.

Such a conventional noise reduction circuit, however, has a drawback, as described below.

In an example of changing of signals in the picture-in-motion, a state occurs in which one frame difference signal between two successive signals of first color difference signal, e.g., R−Y, is lower than a prescribed level and another frame difference signal of second color difference signal, e.g., B−Y, is higher than the prescribed level.

FIG. 1 shows such a typical example. in FIG. 1, vector Ca represents a prior chrominance signal prior to a period of one frame. Vector Cb represents a present chrominance signal at a present time. Both the prior chrominance signal Ca and the present chrominance signal Cb are successive signals of chrominance signals C.

Vector C1b represents a present first frame color difference signal corresponding to the first color difference signal, e.g., R−Y, of the present chrominance signal Cb.

Vector C1a represents a prior first frame color difference signal corresponding to the first color difference signal R−Y of the prior chrominance signal Ca. The prior first frame color difference signal C1a is obtained by decoding the prior chrominance signal Ca and delaying the decoded signal by the period of one frame through a frame memory.

Vector C2b represents a present second frame color difference signal corresponding to the second color difference signal, e.g., B−Y, of the present chrominance signal Cb.

Vector C2a represents a prior second frame color difference signal corresponding to the second color difference signal B−Y of the prior chrominance signal Ca. The prior second frame color difference signal C2a is obtained by decoding the prior chrominance signal Ca and delaying the decoded signal by the period of one frame through another frame memory.

A signal component e1 represents a first frame difference signal between the prior first frame color difference signal C1a and the present first frame color difference signal C1b.

Another signal component e2 represents a second frame difference signal between the prior second frame color difference signal C2a and the present second frame color difference signal C2b. Hereupon, the first frame difference signal e1 is lower than a prescribed level, and the second frame difference signal e2 is higher than the prescribed level.

As shown in FIG. 1, the chrominance signal C changes from the prior chrominance signal Ca to the present chrominance signal Cb during the period of one frame. Thus, one frame difference signal, e.g., the first frame difference signal e1, is lower than the prescribed level and the other frame difference signal, e.g., the second frame difference signal e2, is higher than the prescribed level.

FIG. 2 shows an example of the noise extraction characteristic R of a typical converting circuit, a described before. In such a converting circuit, a frame difference signal between two successive color difference signals is converted to a corresponding noise component in accordance with the noise extraction characteristic R. In FIG. 2, the symbol e1 corresponds to the first frame difference signal e1 in FIG. 1. The symbol x represents the prescribed level. The symbol eN1 represents a compensation signal converted from the first frame difference signal e1 in accordance with the noise extraction characteristic R, as described above. In FIG. 2, the symbol e2 also corresponds to the second frame difference signal e1 in FIG. 1. The symbol eN2 represents a compensation signal converted from the second frame difference signal e2 in accordance with the noise extraction characteristic R.

When such a frame difference signal e2 with a level higher than a prescribed level is obtained, the conventional converting circuit interrupts the converting operation. For example, second frame difference signal e2 with the level higher than the prescribed level is not converted to a corresponding compensation signal.

In the conventional noise reduction circuit for chrominance signal, however, both the noise reduction circuits or the converting circuits corresponding to the respectives of two color difference signals carry out the noise reduction operation independently.

As a result, the noise reduction for the first color difference signal is carried out, but the noise reduction for the second color difference signal is interrupted, as shown in the above example. In other words, the conventional noise reduction circuit may carry out the noise reduction, in spite of a considerable change occurring in two successive video signals due to a typical picture-in-motion. This causes a defect in that displayed images are affected with an incompatibility such as a residual image, etc.

SUMMARY OF THE INVENTION

It is, therefore, an object of the present invention to provide a noise reduction circuit for a chrominance signal which can improve the compatibility of displayed images, such as residual images.

In order to achieve the above object, a noise reduction circuit for a chrominance signal according to one aspect of the present invention includes a decoder for decoding first and second color difference signals, each including a noise component from a received chrominance signal, a signal subtraction circuit for generating a first frame difference signal in response to two successive first color difference signals and a second frame difference signal in response to two successive second color difference signals, a signal converting circuit for generating a first compensation signal from the first frame difference signal and a second compensation signal from the second frame difference signal, a noise reduction circuit for reducing noise, from the color difference signals in response to the compensation signals, a discrimination circuit for discriminating whether both the first and second frame difference signals are smaller than a prescribed level or not and for generating a control signal in response thereto and a signal transmission circuit for transferring the compensation signals from the signal converting circuit to the noise reduction circuit in response to the control signal only when both the frame difference signals are smaller than the prescribed level.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the present invention becomes better understood by reference to the following detailed description considered in connection with the accompanying drawings, wherein.

DETAILED DESCRIPTION OF THE PREFERRED EMBODIMENTS

The present invention will be described in detail with reference to FIG. 3.

Figure 1:
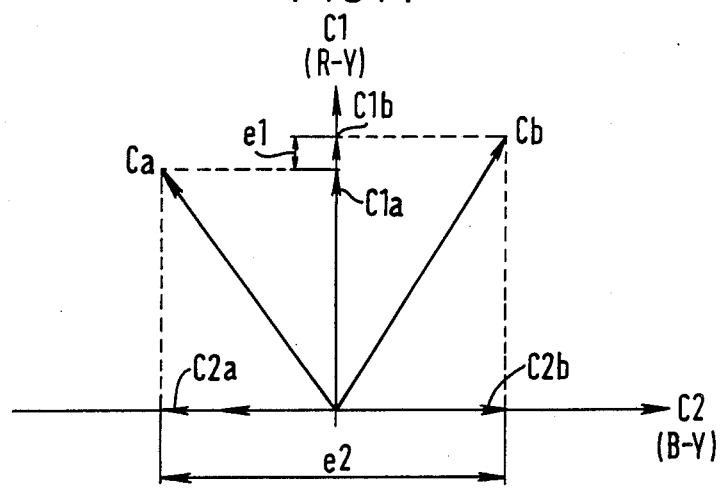
FIG. 1 is a vector diagram showing an example of a change between frames of the chrominance signal and color difference signals.
Figure 2:
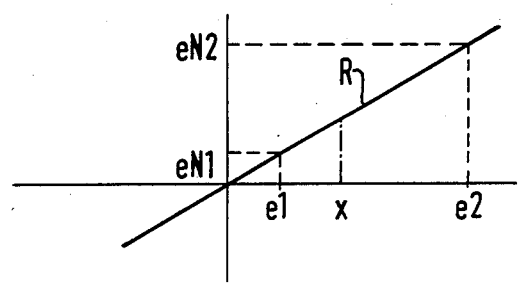
FIG. 2 is a characteristic diagram showing an example of compensation signal converting operation of a conventional noise reduction circuit.
Figure 3:
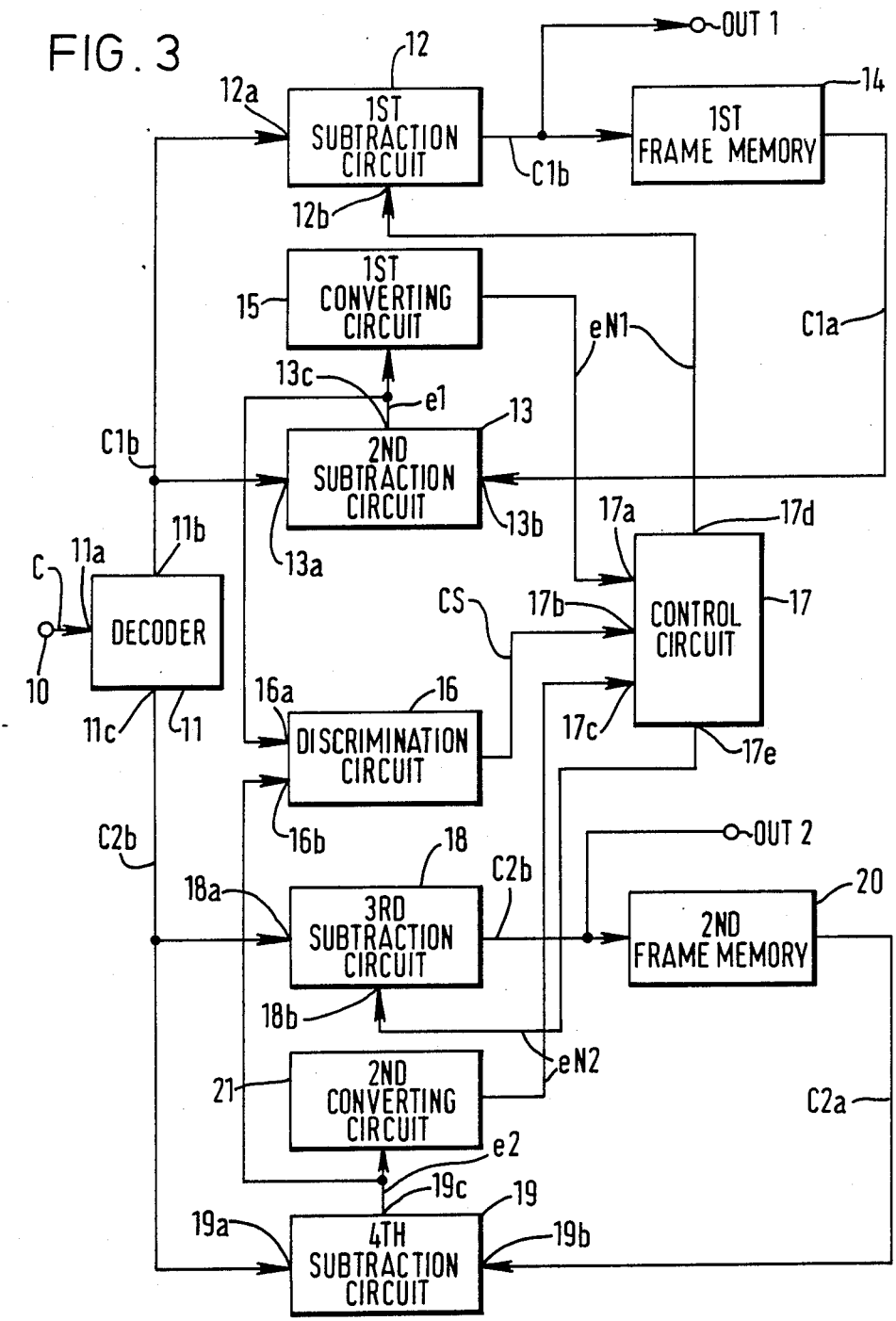
FIG. 3 is a block diagram showing an embodiment of a noise reduction circuit according to the present invention.

FIG. 3 is a block diagram showing an embodiment of the noise reduction circuit according to the present invention. In FIG. 3, an input circuit 10 is provided for receiving chrominance signals C. For example, a prior chrominance signal Ca and a present chrominance signal Cb are successively supplied to the input circuit 10 from a conventional video signal demodulating circuit (not shown). The prior and present chrominance signals Ca and Cb are successively applied into an input terminal 11a of a decoder 11. Hereinafter, descriptions will be made mainly for the present chrominance signal Cb and related signals thereto. The decoder 11 decodes a pair of first and second color difference signals C1b and C2b from the present chrominance signal Cb applied thereto. For example, these color difference signals C1b and C2b represent the color difference signals R−Y and B−Y, as provided in the NTSC television system.

These color difference signals C1b and C2b are output from the decoder 11 through output terminals 11b and 11c thereof, respectively.

The first color difference signal C1b is applied to both first input terminals 12a, 13a of first and second subtraction circuits 12 and 13 in parallel. The first subtraction circuit 12 selectively carries out a signal subtraction between the first color difference signal C1b applied thereto through the first input terminal 12a and a first compensation signal eN1 applied thereto through a second input terminal 12b thereof. Thus, the first subtraction circuit 12 selectively operates to reduce noises from the first color difference signal C1b, when the first compensation signal eN1 is applied thereto. The detail of the first compensation signal eN1 will be described later.

The first color difference signal C1b output from the first subtraction circuit 12 is applied both a first output circuit OUT1 and a first frame memory 14 in parallel. Thus, the first color difference signal C1b output from the first subtraction circuit 12 is obtained from the first output circuit OUT1.

The first frame memory 14 stores first color difference signals C1b for a period of one frame, according to a conventional manner. Now it is assumed that the first frame memory 14 formerly stored a prior first color difference signal C1a. Thus, the delayed signal C1a of the first color difference signal C1 delayed by the period of one frame is presently output from the first frame memory 14. Hereinafter, the delayed signal C1a will be referred to as a prior first frame color difference signal, while the aforementioned first color difference signal C1b will be referred to as a present first frame color difference signal.

The prior first frame color difference signal C1a output from the first frame memory 14 is applied to a second input terminal 13b of the second subtraction circuit 13. On the other hand, the present first frame difference signal C1b is applied to the first input terminal 13a of the second subtraction circuit 13, as described before. The second subtraction circuit 13 carries out a signal subtraction between the present first frame color difference signal C1b applied thereto through the first input terminal 13a and the prior first frame color difference signal C1a applied thereto through the second input terminal 13b. Thus, a difference therebetween, i.e., a first frame difference signal e1 is output from the second subtraction circuit 13 through an output terminal 13c thereof.

The first frame difference signal e1 is applied to both a first converting circuit 15 and a first input terminal 16a of a discrimination circuit 16 in parallel. Another frame difference signal, i.e., a second frame difference signal e2, which will be described in detail later, is also applied to a second input terminal 16b of the discrimination circuit 16.

The first converting circuit 15 converts the first frame difference signal e1 to a corresponding noise component eN1 in accordance with a noise extraction characteristic R. The first compensation signal eN1 is applied to a first data input terminal 17a of a control circuit 17 which will be described later.

The discrimination circuit 16 discriminates the levels of the first frame difference signal e1 and the second frame difference signal e2 and outputs a control signal CS in response to the levels of the first frame difference signal e1 and the second frame difference signal e2, as described in detail later.

The second color difference signal C2b is applied to both first input terminals 18a, 19b 19a of third and fourth subtraction circuits 18 and 19 in parallel. The third subtraction circuit 18 selectively carries out a signal subtraction between the color difference signal C2b applied thereto through the first input terminal 18a and a second compensation signal eN2 applied thereto through a second input terminal 18b thereof. Thus, the third subtraction circuit 18 selectively operates to reduce noises from the color difference signal C2b, when the second compensation signal eN2 is applied thereto. The detail of the second compensation signal eN2 will be described later.

The second color difference signal C2b output from the third subtraction circuit 18 is applied to both a second output circuit OUT2 and a second frame memory 20 in parallel. Thus, the second color difference signal C2b output from the third subtraction circuit 18 is obtained from the second output circuit OUT2.

The second frame memory 20 also stores the second color difference signals C2b for the period of one frame, according to a conventional manner. Now it is assumed that the second frame memory 20 formerly stored a prior second color difference signal C2a. Thus, the delayed signal C2a of the second color difference signal C2 delayed by the period of one frame is presently output from the second frame memory 20. Hereinafter, the delayed signal C2a will be referred to as a prior second frame color difference signal, while the aforementioned second color difference signal C2b will be referred to as a present second frame color difference signal.

The prior second frame color difference signal C2a output from the second frame memory 20 is applied to a second input terminal 19b of the fourth subtraction circuit 19. On the other hand, the present second frame color difference signal C2b is applied to the first input terminal 19a of the fourth subtraction circuit 19, as described before. The fourth subtraction circuit 19 carries out a signal subtraction between the present second frame color difference signal C2b applied thereto from the decoder 11 and the prior second frame color difference signal C2a applied thereto from the second frame memory 20. Thus, the afore-mentioned second frame difference signal e2 is output from the fourth subtraction circuit 19 through an output terminal 19c thereof.

The second frame difference signal e2 is applied to both a second converting circuit 21 and the second input terminal 16b of the discrimination circuit 16 in parallel.

The second converting circuit 21 converts the second frame difference signal e2 to a corresponding compensation signal eN2 in accordance with the noise extraction characteristic R. The second compensation signal eN2 is applied to a second data input terminal 17c of the control circuit 17.

The discrimination circuit 16 discriminates the levels of the first frame difference signal e1 and the second frame difference signal e2 and determine whether the levels are higher or lower than a prescribed level x. The discrimination of the discrimination circuit 16 may correspond to the following four possible states:

I. Both the first frame difference signal e1 and the second frame difference signal e2 are smaller than the prescribed level x;

II. The first frame difference signal e1 is smaller than the prescribed level x, and the second frame difference signal e2 is larger than the prescribed level x;

III. The first frame difference signal e1 is larger than the prescribed level x, and the second frame difference signal e2 is smaller than the prescribed level x; and IV. Both the first frame difference signal e1 and the second frame difference signal e2 are larger than the prescribed level x.

The discrimination circuit 16 outputs the control signal CS in the case I. On the other hand, the discrimination circuit 16 fails to output the control signal CS in the cases II, III and IV. Thus, the control signal CS is output from the discrimination circuit 16 only when both the levels of the first frame difference signal e1 and the second frame difference signal e2 are smaller than the prescribed level x, and the control signal CS is not output from the discrimination circuit 16 when either or both the levels of the first frame difference signal e1 and the second frame difference signal e2 are larger than the prescribed level x. The control signal CS is applied to the control input terminal 17b of the control circuit 17, as described before.

The control circuit 17 transfer the first compensation signal eN1 and the second compensation signal eN2 applied from the first converting circuit 15 and the second converting circuit 21 to control input terminals 12c, 18c of the first subtraction circuit 12 and the third subtraction circuit 18 under the control of the control signal CS. In other words, the control circuit 17 transfer both the first compensation signal eN1 and the second compensation signal eN2 to the first subtraction circuit 12 and 18 when the control signal CS is applied from the discrimination circuit 16. However, the control circuit 17 interrupts the transmission of both the first compensation signal eN1 and the second compensation signal eN2 when the control signal CS is not applied from the discrimination circuit 16. As a result, both the first compensation signal eN1 and the second compensation signal eN2 are applied to the first subtraction circuit 12 and 18 when both the levels of the first frame difference signal e1 and the second frame difference signal e2 are smaller than the prescribed level x. On the other hand, both the first compensation signal eN1 and the second compensation signal eN2 are not applied to the first subtraction circuit 12 and 18 when either or both the levels of the first frame difference signal e1 and the second frame difference signal e2 is larger than the prescribed level x.

The first subtraction circuit 12 carries out the subtraction between the present first frame color difference signal C1b and the first compensation signal eN1. The first compensation signal eN1 corresponds to a noise component included in the first prior frame color difference signal C1a. Accordingly, the noise reduction for the first frame color difference signals C1a, C1b, etc. is performed when both the first frame difference signal e1 and the second frame difference signal e2 are smaller than the prescribed level x. The third subtraction circuit 18 also carries out the subtraction between the present second frame color difference signal C2b and the second compensation signal eN2. The second compensation signal eN2 corresponds to a noise component included in the present second frame color difference signal C2b. Accordingly, the noise reduction for the second frame color difference signals C2a, C2b etc. is performed when both the first frame difference signal e1 and the second frame difference signal e2 are smaller than the prescribed level x. Thus, these noise reductions in the first subtraction circuit 12 and the third subtraction circuit 18 are simultaneously carried out. Further, both the noise reductions in the first subtraction circuit 12 and the third subtraction circuit 18 are simultaneously interrupted when either or both the first frame difference signal e1 and the second frame difference signal e1 are larger than the prescribed level x.

As a result, the noise reduction circuit for a chrominance signal according to the present invention can improve the compatibility of displayed images, such as residual images.

In the above-mentioned embodiment, two frame memories 14 and 20 are provided for delaying the first frame color difference signals C1 and the second frame color difference signals C2. However, the present invention also can be realized by a single frame memory. Such a delay operation using a single frame memory is realized by multiplexing the first frame color difference signal C1 and the second frame color difference signal C2 to a single multiplexed signal. Further, the present invention can use a field memory in place of the frame memory. Further, by processing the first frame color difference signal C1 and the second frame color difference signal C2 with time division, each set of two corresponding circuits, i.e., the set of the first subtraction circuit 12 and the third subtraction circuit 18, the set of the second subtraction circuit 13 and the fourth subtraction circuit 19, and the set of the first converting circuit 15 and the second converting circuit 21 may be unified to a single circuit, respectively. Furthermore, by carrying out the time division processing also to include a luminance signal Y, the circuit may be used in combination with the luminance signal system (including the frame memory).

As described above, the noise reduction circuit for chrominance signal according to the present invention can reduce the noise without deterioration of the picture quality even if the chrominance signal changes between frames.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A circuit for reducing noises in a chrominance signal in a television receiver, comprising:

decoding means for decoding first and second color difference signals from a received chrominance signal, the first and second color difference signals each including a noise component;

means for generating a first frame difference signal in response to two successive first color difference signals and a second frame difference signal in response to two successive second color difference signals;

means for generating a first compensation signal from the first frame difference signal and second compensation signal from the second frame difference signal;

means for reducing noise from the color difference signals in response to the compensation signals;

discrimination means for discriminating whether both the first and second frame difference signals are smaller than a prescribed level and for generating a control signal in response thereto; and means for transferring the compensation signals from the extracting means to the reducing means in response to the control signal only when both the frame difference signals are smaller than the prescribed level.

2. The circuit of claim 1 wherein the generating means includes frame storage means for delaying the first and second color difference signals for a period corresponding the the time between successive frames of the first and second color difference signals.

3. A circuit for reducing noise in a chrominance signal in a television receiver, comprising:

decoding means for decoding first and second color difference signals from a received chrominance signal, the first and second color difference signals each including a noise component;

means for generating a first frame difference signal in response to two successive first color difference signals and a second frame difference signal in response to two successive second color difference signals;

means for generating a first compensation signal from the first frame difference signal and a second compensation signal from the second frame difference signal;

means for reducing noise from the color difference signals in response to the compensation signals;

discrimination means for discriminating whether at least one of the first and second frame difference signals is larger than a prescribed level and for generating a control signal in response thereto; and means for interrupting transmission of the compensation signals from the extracting means to the reducing means in response to the control signal only when at least one of the frame difference signals is larger than the prescribed level.

4. The circuit of claim 3 wherein the generating means includes frame storage means for delaying the first and second color difference signals for a period corresponding to the time between successive frames of the first and second color difference signals.

* * * * *

UNITED STATES PATENT AND TRADEMARK OFFICE
CERTIFICATE OF CORRECTION

PATENT NO. : 4,928,165
DATED : May 22, 1990
INVENTOR(S) : Masaaki Kisou

It is certified that error appears in the above-identified patent and that said Letters Patent is hereby corrected as shown below:

On the Title page, item (54) and col. 1, in the title: change "NOISE REDUCTION CIRCUIT FOR A CHROMINANCE SIGNAL OF A USING FRAME CORRELATION" to --NOISE REDUCTION CIRCUIT FOR A CHROMINANCE SIGNAL OF A TELEVISION RECEIVER USING FRAME CORRELATION--.

Claim 2, column 8, line 61, after "corresponding", "the" (first occurrence) should be --to--.

Signed and Sealed this

Fifteenth Day of December, 1992

Attest:

DOUGLAS B. COMER

*Attesting Officer*    *Acting Commissioner of Patents and Trademarks*